Sept. 15, 1936.   A. CAMPBELL   2,054,407
ARTIFICIAL BAIT
Filed March 1, 1935
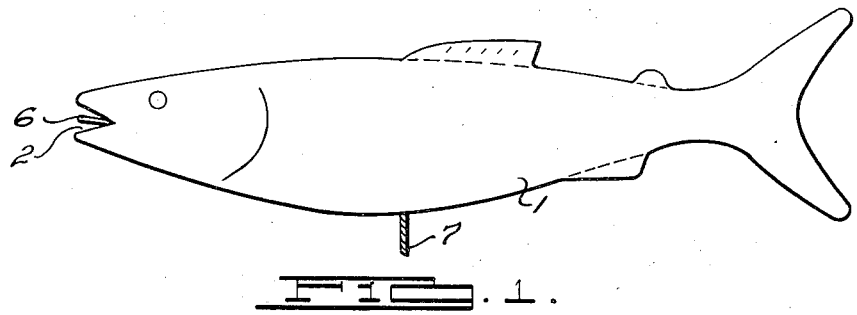
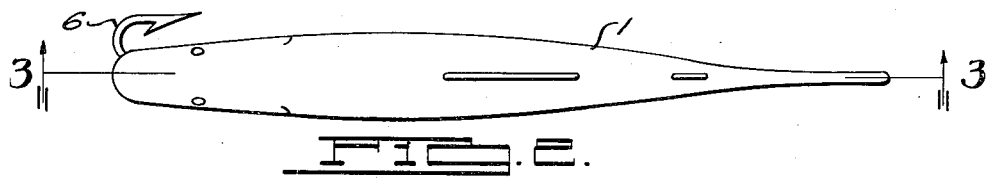
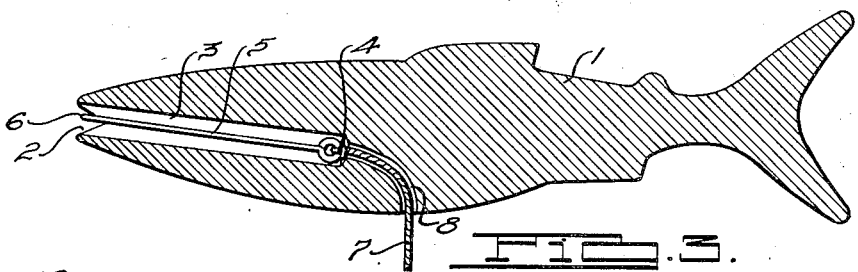
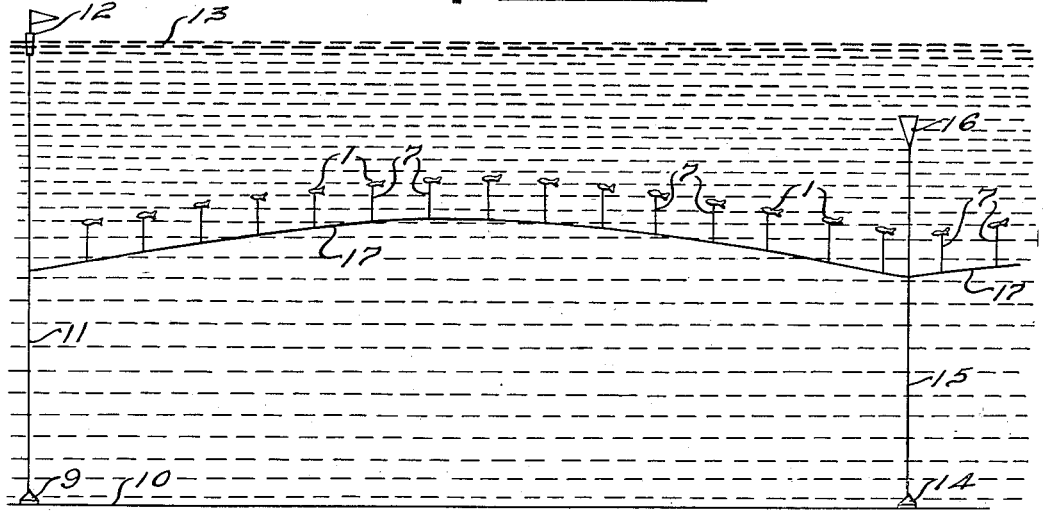
INVENTOR
Allen Campbell.
BY
ATTORNEY Patented Sept. 15, 1936

2,054,407

UNITED STATES PATENT OFFICE 2,054,407

ARTIFICIAL BAIT

Allen Campbell, Charlevoix, Mich.

Application March 1, 1935, Serial No. 8,839

8 Claims. (Cl. 43—4)

This invention relates to artificial baits and the object of the invention is to provide an artificial bait having an opening leading from the mouth inwardly toward the center of the bait and a smaller opening extending downwardly from the first named opening and opening downwardly through the belly of the bait.

Another object of the invention is to provide an artificial bait having an opening extending inwardly from the mouth of the bait in which a hook is freely mounted and provided with a fish line attached to the hook and leading from the opening downwardly through the center of the bait.

Another object of the invention is to provide an artificial bait in which the bait when struck by a fish may slide up the line preventing mutilation of the bait by the fish while the fish is struggling on the hook.

A further object of the invention is to provide an artificial bait made of a floating solid rubber having about the consistency of a fish or minnow and provided with an opening leading from the mouth of the bait and opening through the belly of the bait.

Another object of the invention is to provide a bait which may be anchored in position by the line which leads from the belly of the bait and which floats in a position to hold the hook in the mouth of the bait so as to be in position to catch the fish when it strikes the bait.

A further object of the invention is to provide a bait having a V-shaped notch forming the mouth and an opening leading inwardly from the mouth, the hook being positioned in the opening with the bent portion thereof engaging in the V-shaped notch forming the open mouth.

These objects and the several novel features of the invention are hereinafter more fully described and claimed and the preferred form of construction by which these objects are attained is shown in the accompanying drawing in which—

Fig. 1 is a side elevation of an artificial bait embodying my invention.

Fig. 2 is a plan view thereof.

Fig. 3 is a section taken on line 3—3 of Fig. 2.

Fig. 4 is a view illustrating the method of use of the artificial bait.

The artificial bait is intended for use in commercial fishing to take the place of the live bait generally used in commercial fishing and to eliminate the labor of the boat crew in obtaining live bait and also eliminating the expense attached to buying nets and keeping them in repair for obtaining live bait. The artificial bait comprises a fish shaped member 1 which may be formed of a floating solid rubber, sponge rubber or similar material having about the consistency of fish flesh. This bait is formed in the shape of a fish and is also decorated to look like a fish. The open mouth is formed by means of a V-shaped notch 2 formed in the body of the bait at the forward end and as shown in Fig. 3 a hook recess 3 leads from the mouth of the bait to about the point 4 near the center of the bait. The shank of a fish hook 5 is positioned in the recess 3 and the bent portion 6 of the hook fits in the V-shaped notch 2 forming the mouth and rests in position in the notch. The fish line 7 is attached to the eye of the hook 5 and leads through a curved channel 8 which opens at one end into the recess 3 and opens downwardly at the opposite end through the belly of the bait. This channel 8 is formed on a curve so as to reduce wear on the fish line 7 to a minimum.

As hereinbefore described, the bait is made from a floating material and the line 7 represents a snood line shown more particularly in Fig. 4. In rigging the baits for fishing for lake trout, for instance, an anchor 9 is dropped to the lake bottom 10 and this anchor 9 is connected by a vertical line 11 to a buoy 12 floating on the lake surface 13. Another anchor 14 is dropped to the lake bottom and is connected by means of a vertical line 15 to a cedar float 16 which remains below the surface of the lake and the two mains below the surface of the lake and the two lines 11 and 15 are connected by a horizontal maitre line 17. The snood lines 7 are connected to the maitre line 17 at about fifteen foot intervals and the baits being of a floating type will rise to the upper ends of the snood lines 7 and will be stopped in their rising movement by the bent portions 6 of the fish hooks engaging in the V-shaped notches 2 at the forward ends of the hook recesses 3. The baits will remain in this position in still water with the hooks presented at the mouth of each bait.

Where there is a current, of course, the snood lines will extend at an angle from the maitre line but, at the same time, the effect of the bait in rising will retain the hooks in the notches 2 forming the mouths of the baits. When the bait is struck by the fish and the fish becomes hooked, the bait is pushed along the line 7 away from the hook and the struggles of the fish on the hook will tend to drive the bait away from the fish and prevent damage to the bait by the fish. Thus the artificial bait will normally remain in proper position for the fish to become hooked and when the fish is hooked the bait will be moved away from the hook to prevent damage to the bait.

From the foregoing description it becomes evident that the device is very simple and efficient in operation, may be entirely molded from solid rubber, sponge rubber or other material, may be quickly and easily assembled on the snood lines and provides a device which accomplishes the objects described.

Having thus fully described my invention, its utility and mode of operation, what I claim and desire to secure by Letters Patent of the United States is—

1. An artificial bait comprising a floating body member having the shape of a fish and being provided with an open mouth at the forward end in the form of a V-shaped notch, the body member being provided with a hook recess leading inwardly from the open mouth, a hook having a shank positioned in the recess and the bent portion of the hook engaging in the V-shaped notch forming the mouth, the body being provided with a channel leading from the inner end of the hook recess downwardly through the center of the bait, and a line secured to the hook and extending through the channel, the arrangement being such that when the line is anchored in water the body will tend to float and retain the bent portion of the hook in the V-shaped notch forming the mouth.

2. An artificial bait comprising a floating body member having the shape of a fish and being provided with an opening therethrough leading from the mouth of the fish downwardly through the belly, the body being provided with a V-shaped notch forming the mouth of the fish, a hook positioned in the opening with the return bent portion seating in the V-shaped notch and a line secured to the hook and extending downwardly through the opening in the belly, the arrangement being such that the floating action of the body will maintain the hook engaged in the notch at the mouth of the body.

3. An artificial bait comprising a body member having the shape of a fish and being provided with an opening therethrough leading from the mouth of the fish downwardly through the belly, a fish line extending through the opening, a hook secured to the end of the fish line, the body at the forward end being provided with a V-shaped notch forming the mouth of the fish and the notch extending across the opening, the arrangement being such that a pull on the line will seat the return bent portion of the hook in the V-shaped notch.

4. An artificial bait comprising a body member having the shape of a fish and being provided with a V-shaped notch at the mouth, the body member being provided with a hook recess leading from the V-shaped mouth toward the center of the body member and having a channel leading from the hook recess and opening downwardly through the belly of the body member.

5. An artificial bait comprising a floating body member having the shape of a fish and being provided with a channel leading from the mouth of the fish and opening downwardly through the belly of the fish, a line extending through the channel and a hook on the end of the line at the mouth of the fish, said hook having a shank portion movable into the mouth of the fish by tendency of the body member to float thereby removably positioning the barbed end of the hook closely adjacent the mouth of the fish.

6. An artificial bait comprising a maitre line of considerable length, means for supporting the line at a distance below the surface of the water, a series of baits having the shape of a minnow formed of buoyant material, a snood line for each of the baits, one end of the snood lines being respectively attached to the maitre line in spaced relation, a fish hook at the opposite end of each of the snood lines, the said minnow shaped baits each having an aperture opening through the body to the mouth of the bait through which the respective snood line extends whereby the tendency of the bait to rise to the surface causes the hook to be placed at the mouth, the bait being free to move on the line whereby when struck by the fish the bait is moved away from the hook and the hooked fish.

7. An artificial bait comprising a comparatively long maitre line, a series of weighted buoys attached to the line at different points for maintaining the line a desired depth below the surface of the water, a series of snood lines attached to the maitre line at successive points therealong, fish hooks on the free ends of the snood lines, and a buoyant artificial bait having the form of a minnow slidably mounted on ends of the snood lines, the buoyancy of the bait causing the same to move on the snood line to position the hook at the mouth.

8. An artificial bait comprising a comparatively long maitre line, means for maintaining the line at a desired depth below the surface of the water, a series of snood lines attached to the maitre line at successive points therealong, fish hooks on the free ends of the snood lines, and a buoyant artificial bait having the form of a minnow on each of the snood lines at the hook end thereof, the buoyancy of the bait causing the same to take a position above and free from the maitre line.

ALLEN CAMPBELL.